United States Patent
Yunusov et al.

(10) Patent No.: US 11,395,136 B2
(45) Date of Patent: Jul. 19, 2022

(54) IMPAIRMENT BASED PHYSICAL LAYER FINGERPRINT

(71) Applicant: QUALCOMM Incorporated, San Diego, CA (US)

(72) Inventors: David Yunusov, Holon (IL); Assaf Touboul, Netanya (IL); Gideon Shlomo Kutz, Ramat Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 16/583,005

(22) Filed: Sep. 25, 2019

(65) Prior Publication Data

US 2021/0092593 A1    Mar. 25, 2021

(51) Int. Cl.
| | |
|---|---|
| *H04L 29/06* | (2006.01) |
| *H04W 12/03* | (2021.01) |
| *H04W 12/041* | (2021.01) |
| *H04B 7/06* | (2006.01) |
| *H04W 52/52* | (2009.01) |
| *H04B 7/0413* | (2017.01) |

(52) U.S. Cl.
CPC .......... *H04W 12/03* (2021.01); *H04B 7/0617* (2013.01); *H04W 12/041* (2021.01); *H04W 52/52* (2013.01); *H04B 7/0413* (2013.01)

(58) Field of Classification Search
None
See application file for complete search history.

(56) References Cited

U.S. PATENT DOCUMENTS

| | | | |
|---|---|---|---|
| 10,778,295 B2 * | 9/2020 | Khandani | H04B 7/043 |
| 11,258,709 B2 * | 2/2022 | Li | H04L 43/0894 |
| 11,265,704 B2 * | 3/2022 | Hayashi | H04W 12/009 |
| 2009/0110033 A1 * | 4/2009 | Shattil | H04B 1/7174 |
| | | | 375/147 |
| 2018/0219566 A1 * | 8/2018 | Weissman | H04L 27/38 |
| 2020/0021433 A1 * | 1/2020 | Zaman | H04B 10/25 |
| 2020/0044840 A1 * | 2/2020 | Chang | H04L 9/0822 |
| 2021/0092593 A1 * | 3/2021 | Yun | H04W 12/79 |

(Continued)

OTHER PUBLICATIONS

Mehmood, Rashid & Wallace, Jon & Jensen, Michael. (2014). Optimal array patterns for encryption key establishment in LOS channels. 478-479. 10.1109/APS.2014.6904570. (Year: 2014).*

(Continued)

*Primary Examiner* — Jeffery L Williams
(74) *Attorney, Agent, or Firm* — Harrity & Harrity, LLP

(57) ABSTRACT

Various aspects of the present disclosure generally relate to wireless communication. In some aspects, a wireless device may receive a beamformed signal from a transmitting device. The wireless device may estimate a weighted sum based at least in part on one or more coefficients that relate to impairments associated with the transmitting device, a spatial location of the wireless device, and/or the like. The wireless device may determine a cryptographic key based at least in part on a ratio among the plurality of coefficients in the weighted sum, and one or more communications between the wireless device and the transmitting device may be secured based on the cryptographic key. Numerous other aspects are provided.

44 Claims, 4 Drawing Sheets

(56) References Cited

U.S. PATENT DOCUMENTS

2021/0168001 A1\* 6/2021 Agee ...................... H04L 25/08
2021/0297396 A1\* 9/2021 Shattil ................. H04W 12/041

OTHER PUBLICATIONS

D. Bichler, G. Stromberg and M. Huemer, "Innovative Key Generation Approach to Encrypt Wireless Communication in Personal Area Networks," IEEE Globecom 2007—IEEE Global Telecommunications Conference, 2007, pp. 177-181, doi: 10.1109/GLOCOM.2007.41. (Year: 2007).\*
International Search Report and Written Opinion—PCT/US2020/048923—ISA/EPO—Nov. 20, 2020.
Linning P., et al., "An Investigation of Using Loop-Back Mechanism for Channel Reciprocity Enhancement in Secret Key Generation", IEEE Transactions on Mobile Computing, IEEE Service Center, Los Alamitos, CA, US, vol. 18, No. 3, Mar. 1, 2019 (Mar. 1, 2019), pp. 507-519, XP011708724, ISSN: 1536-1233, DOI: 10 1109/TMC.2018.2842215 [retrieved on Feb. 4, 2019] p. 513-p. 514.
Wu C-Y., et al., "Practical Physical Layer Security Schemes for MIMO-OFDM Systems Using Precoding Matrix Indices", IEEE Journal on Selected Areas in Communications, IEEE Service Center, Piscataway, US, vol. 31, No. 9, Sep. 1, 2013 (Sep. 1, 2013), pp. 1687-1700, XP011524968, ISSN: 0733-8716, DOI: 10.1109/JSAC.2013.130904 [retrieved on Aug. 22, 2013], p. 1689-p. 1692; Figures 1,2,3.

\* cited by examiner

IMPAIRMENT BASED PHYSICAL LAYER FINGERPRINT

FIELD OF THE DISCLOSURE

Aspects of the present disclosure generally relate to wireless communication and to techniques and apparatuses for an impairment based physical layer fingerprint. Some techniques and apparatuses described herein may use the impairment based physical layer fingerprint and/or one or more multiple input multiple output (MIMO) multipath channel characteristics to generate a cryptographic key that is not shared during a key exchange session.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless device, may include: receiving a beamformed signal from a transmitting device; estimating a weighted sum based at least in part on a plurality of coefficients associated with the beamformed signal, wherein the plurality of coefficients include one or more coefficients related to one or more impairments associated with the transmitting device and one or more coefficients that depend on a spatial location of the wireless device; determining a cryptographic key based at least in part on a ratio among the plurality of coefficients in the weighted sum associated with the beamformed signal; and securing one or more communications between the wireless device and the transmitting device based at least in part on the cryptographic key.

In some aspects, a wireless device for wireless communication may include a memory and one or more processors coupled with the memory. The memory and the one or more processors may be configured to: receive a beamformed signal from a transmitting device; estimate a weighted sum based at least in part on a plurality of coefficients associated with the beamformed signal, wherein the plurality of coefficients include one or more coefficients related to one or more impairments associated with the transmitting device and one or more coefficients that depend on a spatial location of the wireless device; determine a cryptographic key based at least in part on a ratio among the plurality of coefficients in the weighted sum associated with the beamformed signal; and secure one or more communications between the wireless device and the transmitting device based at least in part on the cryptographic key.

In some aspects, a non-transitory computer-readable medium may store one or more instructions for wireless communication. The one or more instructions, when executed by one or more processors of a wireless device, may cause the one or more processors to: receive a beamformed signal from a transmitting device; estimate a weighted sum based at least in part on a plurality of coefficients associated with the beamformed signal, wherein the plurality of coefficients include one or more coefficients related to one or more impairments associated with the transmitting device and one or more coefficients that depend on a spatial location of the wireless device; determine a cryptographic key based at least in part on a ratio among the plurality of coefficients in the weighted sum associated with the beamformed signal; and secure one or more communications between the wireless device and the transmitting device based at least in part on the cryptographic key.

In some aspects, an apparatus for wireless communication may include: means for receiving a beamformed signal from a transmitting device; means for estimating a weighted sum based at least in part on a plurality of coefficients associated with the beamformed signal, wherein the plurality of coefficients include one or more coefficients related to one or more impairments associated with the transmitting device and one or more coefficients that depend on a spatial location of the apparatus; means for determining a cryptographic key based at least in part on a ratio among the plurality of coefficients in the weighted sum associated with the beamformed signal; and means for securing one or more communications between the apparatus and the transmitting device based at least in part on the cryptographic key.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
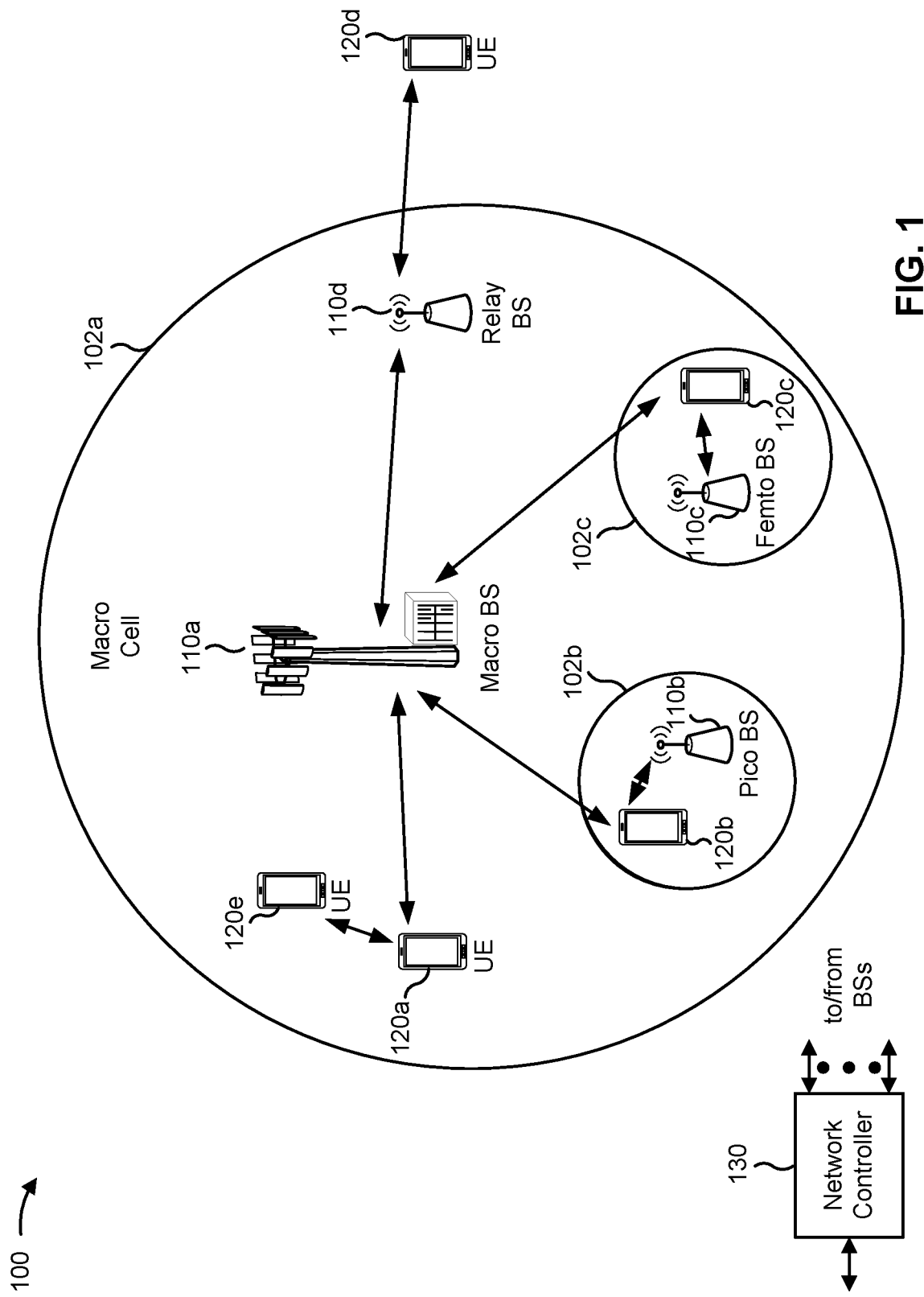
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, a wireless channel, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a wireless or wireline backhaul. The BSs may also communicate with one another (e.g., directly or indirectly) via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
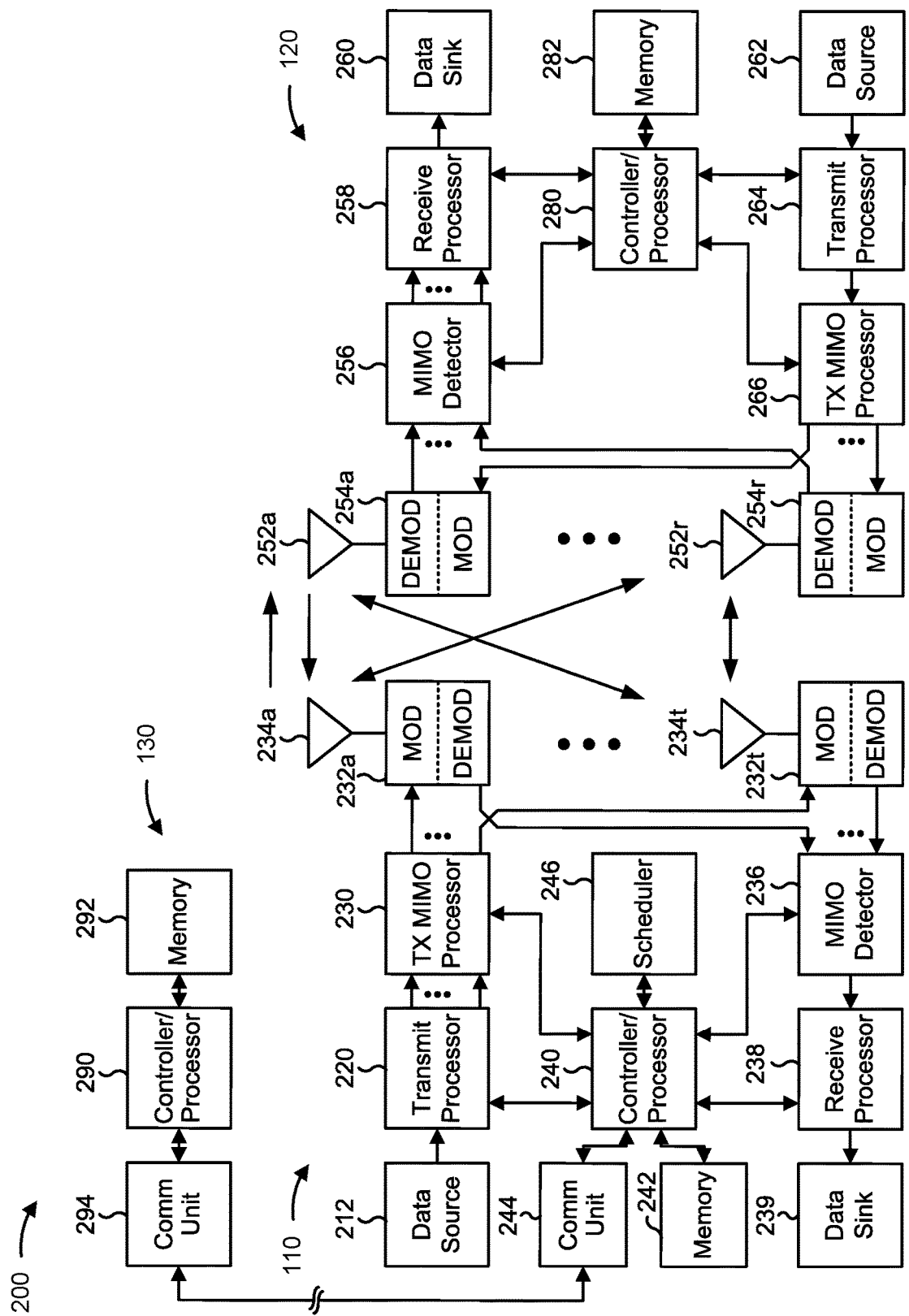
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, controller/processor 290 of network controller 130, and/or any other component(s) of FIG. 2 may perform one or more techniques associated with an impairment based physical layer fingerprint. For example, as described in more detail elsewhere herein, controller/processor 240 of base station 110, controller/processor 280 of UE 120, controller/processor 290 of network controller 130, and/or any other component(s) of FIG. 2 may perform one or more techniques to use the impairment based physical layer fingerprint and/or one or more MIMO multipath channel characteristics to generate a cryptographic key that is not shared during a key exchange session. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242, 282, 292 may store data and program codes for base station 110, UE 120, and network controller 130, respectively. In some aspects, memory 242, memory 282, and/or memory 292 may comprise a non-transitory computer-readable medium storing one or more instructions for wireless communication. For example, the one or more instructions, when executed by one or more processors of the base station 110, the UE 120, the network controller 130, and/or the like may perform or direct operations of, for example, process 400 of FIG. 4 and/or other processes as described herein. A scheduler 246 may schedule UEs for data transmission on the downlink and/or uplink.

In some aspects, base station 110, UE 120, network controller 130, and/or the like may include means for receiving a beamformed signal from a transmitting device, means for estimating a weighted sum based at least in part on a plurality of coefficients associated with the beamformed signal, means for determining a cryptographic key based at least in part on a ratio among the plurality of coefficients in the weighted sum associated with the beamformed signal, means for securing one or more communications between the apparatus and the transmitting device based at least in part on the cryptographic key, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. Additionally, or alternatively, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. Additionally, or alternatively, such means may include one or more components of network controller 290 described in connection with FIG. 2, such as controller/processor 290, memory 292, communication unit 294, and/or the like.

As indicated above, FIG. 2 is provided as an example. Other examples may differ from what is described with regard to FIG. 2.

When two devices communicate over a wireless channel in a wireless network (e.g., an LTE network, an NR network, and/or the like), traffic that is transmitted over the wireless channel may be ciphered or otherwise encrypted using a cryptographic key. For example, security techniques are typically implemented in wireless networks using a known transmit-receive coding that relies on higher-layer encryption with a cryptographic key that is shared among the endpoint devices and used to encrypt plaintext into ciphertext and to decrypt ciphertext into plaintext. Accordingly, to secure the wireless channel and enable confidential communication over the wireless channel, the endpoint devices may perform a key exchange session at the start of a communication session to negotiate or otherwise exchange the cryptographic key(s) to be used during the communication session. In security protocols that rely upon a key exchange session, the need to exchange the cryptographic key(s) to be used during the communication session is a weakness that an unauthorized user (e.g., an eavesdropper) may exploit. For example, if the unauthorized user is able to access the cryptographic key(s), the unauthorized user may decipher or decrypt data that is communicated during the communication session. In other words, if the two devices cannot establish a secure initial key exchange, the devices will be unable to securely communicate over the wireless channel without the risk of information communicated over the wireless channel being intercepted and decrypted by an unauthorized third party who acquired the secret key during the initial key exchange.

Some aspects described herein provide techniques and apparatuses to generate a cryptographic key at different wireless devices in a coordinated manner without the wireless devices explicitly sharing the cryptographic key or any parameters that are used to generate the cryptographic key. For example, one or more components in an analog path may be associated with a set of impairments or artifacts (e.g., a power amplifier non-linearity, a frequency-dependent residual sideband (RSB), a frequency drift, and/or the like) that are unique to a particular device, whereby any given device may have a unique radio frequency (RF) fingerprint that can be used to generate a cryptographic key. For example, the set of impairments or artifacts may generally vary from one device to another such that the set of impairments or artifacts may be unique in the sense that the set of impairments or artifacts may rarely or never be the same for two different devices. Furthermore, some techniques and apparatuses described herein may use beamforming to transmit a beamformed signal toward an intended receiver through a MIMO multipath channel, and the beamformed signal may be associated with a set of digital pre-distortion (DPD) coefficients (e.g., channel phase, beamforming phase, and/or the like) that are different at different spatial locations.

For example, as described herein, a beamformed signal may generally refer to a signal that is transmitted from a device having multiple antennas, and the beamformed signal may be steered in a particular direction (e.g., towards an intended receiver) by controlling signals transmitted from the multiple antennas. Accordingly, as described in further detail herein, a transmitting device with multiple transmit antennas may generate a cryptographic key based on one or more impairments associated with one or more components (e.g., power amplifiers) in an analog path, and the transmitting device may use beamforming techniques to steer a beam (e.g., a beamformed signal) toward a spatial location of the intended receiver through the MIMO multipath channel. As described in further detail below, the intended receiver may estimate a weighted sum associated with the beam and use the weighted sum to derive the same cryptographic key as the transmitting device, based on one or more coefficients that relate to the impairments associated with the one or more components in the analog path and certain properties that the DPD coefficients of the beam have when the intended receiver is spatially located at or near the center of the beam steered toward the intended receiver.

In this way, the wireless devices (e.g., the transmitting device and the intended receiver) may use the cryptographic key to secure one or more communications over the MIMO multipath channel without having to perform a key exchange session or otherwise explicitly share the cryptographic key or the parameter(s) used to generate the cryptographic key. Furthermore, because the DPD coefficients are different at different spatial locations, an eavesdropper device at a different physical location cannot correctly estimate the one or more coefficients that relate to the impairments associated with the one or more components in the analog path between the wireless devices 310, 320 and therefore cannot generate the cryptographic key used to secure the one or more communications between the wireless devices 310, 320.

Figure 3:
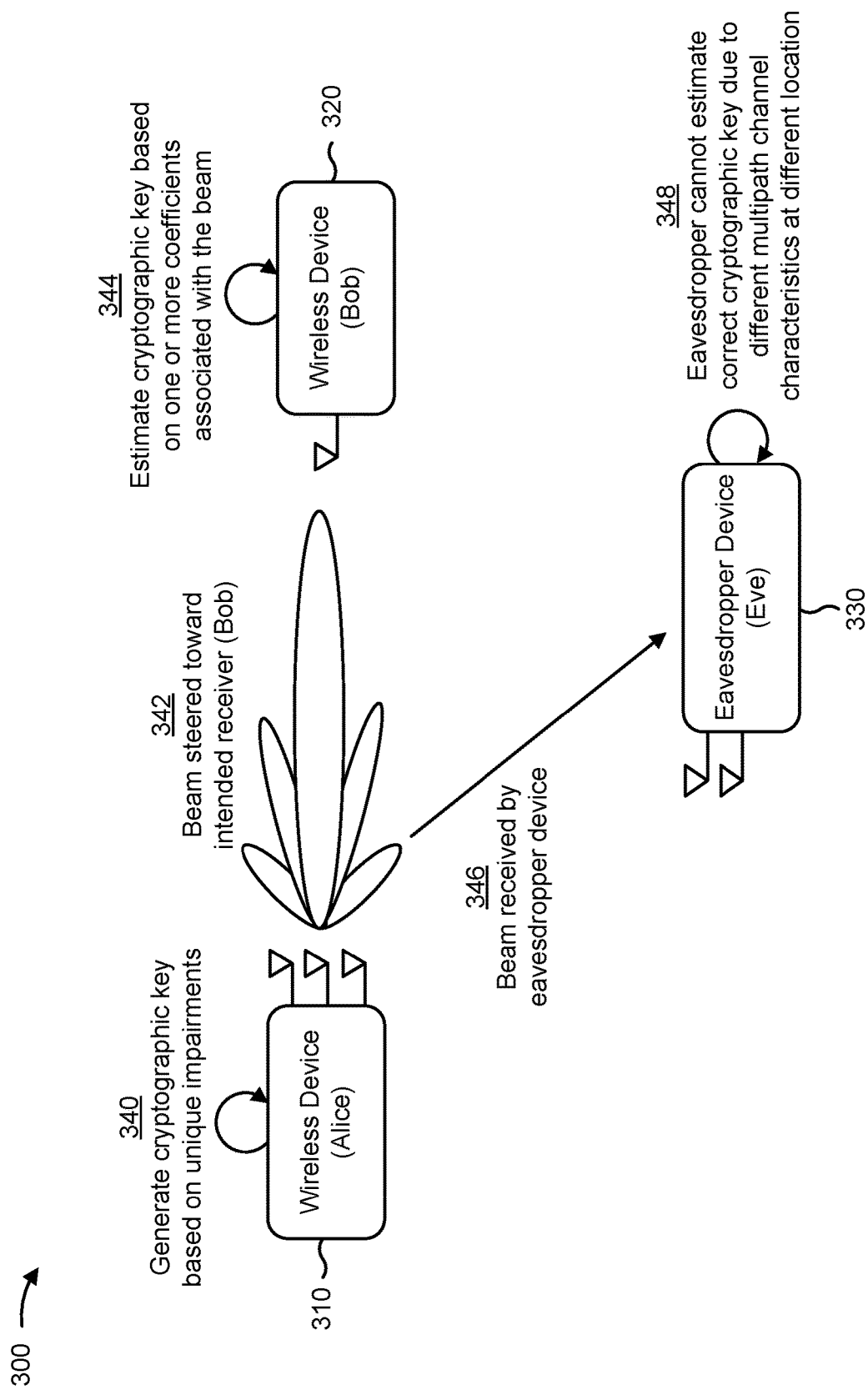
FIG. 3 is a diagram illustrating an example implementation in which two wireless devices independently generate a cryptographic key based on a unique physical layer fingerprint, in accordance with various aspects of the present disclosure.

FIG. 3 is a diagram illustrating an example implementation 300 in which two wireless devices independently generate a cryptographic key based on a unique physical layer fingerprint, in accordance with various aspects of the present disclosure. For example, as described in further detail herein, the two wireless devices may independently generate the cryptographic key based on one or more impairments that are unique to one or more components in an analog RF path between the wireless devices. For example, in the example implementation 300 shown in FIG. 3, a first wireless device 310 (Alice) and a second wireless device 320 (Bob) are to establish a secure communication session that is protected against unauthorized access by an eavesdropper device 330 (Eve). In general, the first wireless device 310 and the second wireless device 320 may correspond to a base station and a UE that are communicating via an uplink and a downlink, a pair of UEs that are communicating via a sidelink, a pair of network devices (e.g., a base station, a network controller, a server, and/or the like) that are communicating via a wireless backhaul link, and/or the like.

In the example implementation 300 shown in FIG. 3, the first wireless device 310 may correspond to a multiple antenna transmitter transmitting a beamformed signal (which may be referred to herein simply as a beam) that is steered toward the second wireless device 320, which has one or more receive antennas. In general, the multiple transmit antennas may each be associated with one or more non-linear power amplifiers. More particularly, in a linear power amplifier, an output signal is typically directly proportional to an input signal, whereas a non-linear power amplifier may produce an output signal that is not directly proportional to the input signal. For example, in a wireless device with multiple transmit antennas that are each associated with one or more non-linear power amplifiers, an output signal from each non-linear power amplifier may be represented as follows:

$$PA_n = x + a_n |x|^2 x$$

where n is an index of the non-linear power amplifier, x is an input signal to the non-linear power amplifier, $a_n$ is a coefficient that represents an amount of non-linearity in the power amplifier (e.g., depending on a power supplied to the non-linear power amplifier), and the higher-order term $a_n|x|^2x$ is a Volterra kernel that represents the non-linearity of the power amplifier. In general, a value of the coefficient $a_n$ may be the same or different for each power amplifier. For example, as described in further detail elsewhere herein, the value of the of the coefficient $a_n$ may be independently controlled for each power amplifier (e.g., based on unique characteristics associated with the power amplifiers, power levels supplied to the power amplifiers, and/or the like). Furthermore, although the foregoing example represents the non-linearity of the power amplifier using one Volterra kernel, in some aspects, a non-linearity for one or more power amplifiers may be represented using one or more additional Volterra kernels (e.g., $b_n|x|^4x$ and/or the like). Accordingly, in some aspects, the output signal from each non-linear power amplifier may generally include a linear term (e.g., x in the foregoing example), and any suitable quantity non-linear terms (or Volterra kernels) to represent any suitable type of non-linear behavior, effect, characteristic, property, and/or the like associated with one or more components in an analog RF path between the wireless devices 310, 320. For example, in the above example, $a_n|x|^2x$ may represent a non-linear relationship between input power and output power associated with a power amplifier, although the Volterra kernel(s) may represent or otherwise model other suitable types of non-linear behavior, such as memory effects that cause power amplifier characteristics to change as a function of past input levels and/or the like.

As shown in FIG. 3, and by reference number 340, the first wireless device 310 may generate a cryptographic key to be used to secure one or more communications with the second wireless device 320, based on one or more unique impairments that provide the first wireless device 310 with a unique RF fingerprint. For example, as described herein, the unique impairments may include non-linearities of the power amplifiers that are represented in the manner described above. Additionally, or alternatively, in some aspects, the unique impairments may include a frequency-dependent RSB that relates to a mismatch between in-phase (I) and quadrature (Q) components, a frequency drift or oscillator phase noise that relates to an offset of an oscillator from a nominal frequency (e.g., due to component aging, temperature changes, variations in bias voltage, and/or the like), and/or other suitable artifacts in an analog path that provide a unique RF fingerprint for a particular wireless device.

In some aspects, when the unique impairment(s) used by the first wireless device 310 to generate the cryptographic key relate to power amplifier non-linearities, the cryptographic key may correspond to an average of the non-linearity coefficients over all of the power amplifiers in a particular analog path (e.g., the power amplifiers associated with the multiple transmit antennas in a given transmit chain). For example, in some aspects, the cryptographic key that is generated by the first wireless device 310 and to be used to secure the one or more communications with the second wireless device 320 may be represented as follows:

$$\frac{1}{n}\Sigma_n a_n$$

where n is the index of each non-linear power amplifier and $a_n$ is the coefficient that represents the amount of non-linearity per power amplifier. For example, as shown by reference number 342, the first wireless device 310 may transmit a beam that is steered toward an intended receiver (the second wireless device 320), and the beam may generally be transmitted using multiple transmit antennas that are coupled to multiple power amplifiers, each of which may be associated with a different non-linearity coefficient $a_n$ because the power amplifiers may each have unique non-linearity properties. Accordingly, an average of the non-linearity coefficients across all power amplifiers may be used as the cryptographic key, and as shown by reference number 344, the second wireless device 320 may estimate the cryptographic key based on one or more coefficients associated with the beam that is transmitted by the first wireless device 310. For example, in order to steer the beam toward the second wireless device 320, the first wireless device 310 may control a beamforming phase, a relative amplitude, and/or the like associated with the signal at each transmit antenna to create a pattern of constructive and destructive interference that results in the signal coherently combining at a spatial location of the second wireless device 320. Accordingly, the second wireless device 320 may estimate the cryptographic key that was generated by the first wireless device 310 based on various coefficients associated with the beam received from the first wireless device 310, which may include one or more coefficients that relate to one or more impairments (e.g., non-linearities) uniquely associated with the multiple power amplifiers at the first wireless device 310 and one or more coefficients that depend on the spatial location of the second wireless device 320.

For example, as mentioned above, the first wireless device 310 may transmit the beam that is steered toward the second wireless device 320 using multiple transmit antennas that are each associated with one or more power amplifiers, and the term n may represent a quantity of the transmit antennas. Accordingly, in some aspects, a signal carried in the beam received by the second wireless device 320 may be represented as follows:

$$y_{Bob} = \Sigma_n h_n \theta_n (x + a_n |x|^2 x)$$

where $h_n$ is a channel phase between the second wireless device 320 and the n-th transmit antenna at the first wireless device 310, $\theta_n$ is a beamforming phase applied to the n-th transmit antenna (e.g., in order to steer the beam toward a particular azimuth that results in the beam coherently combining at the spatial location of the second wireless device 320), and $(x + a_n|x|^2 x)$ is the output signal from the n-th power amplifier, as described above. Accordingly, the signal received by the second wireless device 320 may correspond to a weighted sum based on various coefficients that depend on one or more impairments associated with the first wireless device 310 (e.g., power amplifier non-linearities in the present example), beamforming phases that are applied at the first wireless device 310 in order to steer the beam toward the second wireless device 320, and channel phases that depend on one or more MIMO multipath channel characteristics between the first wireless device 310 and the second wireless device 320 (e.g., obstacles, reflective surfaces, and/or other objects in an environment that impact a manner in which signals propagate between the first wireless device 310 to the second wireless device 320).

In some aspects, the second wireless device 320 may estimate the cryptographic key based on a ratio among the plurality of coefficients in the weighted sum associated with the received signal. For example, in some aspects, the second wireless device 320 may estimate the cryptographic key as a ratio of one or more third-order coefficients to one or more first-order coefficients, as follows:

$$\frac{\Sigma_n \theta_n a_n h_n}{\Sigma_n \theta_n h_n}$$

In some aspects, because the beam transmitted by the first wireless device 310 is steered toward the spatial location of the second wireless device 320, the signals transmitted from the multiple antennas of the first wireless device 310 may coherently combine at the spatial location of the second wireless device 320. For example, when a beam is steered or otherwise directed toward a particular azimuth in space, the signals making up the beam may combine coherently in that particular azimuth, which in this case corresponds to the spatial location of the second wireless device 320. In other words, the first wireless device 310 tunes or otherwise controls a value of $\theta_n$ to ensure that the beam will combine coherently at the spatial location of the second wireless device 320, which results in the property whereby $\theta_n h_n \approx 1$ for each transmit antenna. Accordingly, in the above ratio, the $\theta_n h_n$ terms may simplify to one, resulting in the second wireless device 320 estimating the cryptographic key as follows:

$$\frac{\Sigma_n a_n}{n}$$

which is substantially equivalent to the cryptographic key generated at the first wireless device 310. Furthermore, in some aspects, the beam may not be pointed or otherwise centered exactly at the spatial location of the second wireless device 320 (e.g., due to multipath channel characteristics). Accordingly, in some aspects, the second wireless device 320 may quantize the various coefficients in the weighted sum and estimate the cryptographic key based on the quantized coefficients, to minimize a probability that the cryptographic key is incorrectly estimated.

In some aspects, as further shown in FIG. 3, and by reference number 346, an eavesdropper device 330 may also receive the beam that is transmitted by the first wireless device 310. However, as shown by reference number 348, the eavesdropper device 330 cannot estimate the correct cryptographic key because the beam is steered toward the second wireless device 320 (and not toward the eavesdropper device 330), whereby at least the channel phase coefficient will be different at the eavesdropper device 330 due to different multipath channel characteristics. In particular, in a similar manner as described above, a signal carried in the beam received by the eavesdropper device 330 may be represented as follows:

$$y_{Eve} = \Sigma_n g_n \theta_n (x + a_n |x|^2 x)$$

where $g_n$ is a channel phase between a receive antenna at the eavesdropper device 330 and the n-th transmit antenna at the first wireless device 310. Accordingly, when attempting to estimate the cryptographic key as a ratio of the one or more third-order coefficients by the one or more first-order coefficients, the eavesdropper device 330 may estimate the cryptographic key as follows:

$$\frac{\Sigma_n \theta_n a_n g_n}{\Sigma_n \theta_n g_n}$$

In this case, because the beam is not steered toward the eavesdropper device 330, a product of $\theta_n$ and $g_n$ is not equal to one, whereby the eavesdropper device 330 cannot correctly estimate the cryptographic key $$\frac{\Sigma_n a_n}{n}.$$

Furthermore, even it the eavesdropper device 330 is somehow able to obtain the value of $h_n$ (e.g., the channel phase between a receive antenna at the second wireless device 320 and the n-th transmit antenna at the first wireless device 310), the eavesdropper device 330 still cannot use the value of $h_n$ to obtain the correct cryptographic key. For example, even if a reciprocal wireless channel between the first wireless device 310 and the second wireless device 320 is known to the eavesdropper device 330, the eavesdropper device 330 only has access to the weighted sum $$\frac{\Sigma_n \theta_n a_n g_n}{\Sigma_n \theta_n g_n}$$

and cannot estimate the cryptographic key $$\frac{\Sigma_n a_n}{n}$$

without knowing the values of the individual coefficients.

In other words, in order to correctly estimate the cryptographic key as $$\frac{\Sigma_n a_n}{n},$$

the eavesdropper device 330 would have to correctly estimate each of $\theta_n$, $a_n$, and $h_n$ separately, whereas the intended receiver (the second wireless device 320) can use a single receive antenna to estimate the weighted sum only, to derive the correct cryptographic key based on the beam coherently combining at the spatial location of the second wireless device 320. The eavesdropper device 330 would have to employ an array of receive antennas that is at least equal to the number of transmit antennas used at the first wireless device 310 in order to explicitly construct the sum based on individual estimates of $\theta_n$, $a_n$, and $h_n$. This would be prohibitively expensive for many potential eavesdroppers, especially where the first wireless device 310 is a millimeter-wave base station that uses 64, 128, or 256 transmit antennas. Even if the eavesdropper device 330 employs a sufficiently large array of receive antennas (e.g., N receive antennas), the eavesdropper device 330 would need to compute the coefficients of an N×N matrix to individually estimate $\theta_n$, $a_n$, and $h_n$. For example, assuming noise-free reception by the eavesdropper device 330 and an equal number of receive and transmit antennas, the signal received at the m-th antenna at the eavesdropper device 330 is:

$$y_{Eve,m} = \sum_n g_{m,n} \theta_n (x + a_n |x|^2 x)$$

where $g_{m,n}$ is a channel response between the n-th transmit antenna at the first wireless device 310 and an m-th receive antenna at the eavesdropper device 330, which can be written in matrix form as follows:

$$y_{Eve} = G(x + \underline{a}|x|^2 x)$$

where $\underline{a} = [a_0, \ldots a_{(Tx-1)}]^T$ and G is a MIMO (e.g., beamformed) matrix with the element $g_{m,n} \theta_n$ at the m-th row and the n-th column between the first wireless device 310 and the eavesdropper device 330. In this case, the eavesdropper device 330 can only estimate:

$$G^{-1} y_{Eve} = (x + \underline{a}|x|^2 x)$$

and the eavesdropper device 330 can correctly estimate the cryptographic key only if a is perfectly estimated, which is practically impossible due to signal-to-noise ratio (SNR) requirements. For example, in addition to requiring a quantity of receive antennas that equals or exceeds a quantity of transmit antennas used at the first wireless device 310, estimating G is difficult when there are many transmit antennas due to link budget limitations. In contrast, the intended receiver (the second wireless device 320) does not need to estimate the elements of the H channel matrix because a product of $\theta_n$ and $h_n$ simplifies to one (1), based on the beam being steered toward the spatial location of the intended receiver. Likewise, noise and link budget limitations may prevent the eavesdropper device 330 from accurately estimating all elements of $\underline{a}$ because estimation of the individual elements per antenna requires an SNR at the eavesdropper device 330 to be 20 $\log_{10}$ (Tx) higher than an SNR at the second wireless device 320, where Tx is a quantity of transmit antennas used by the first wireless device 310 (e.g., assuming that 128 transmit antennas are used by the first wireless device 310, SNR at the eavesdropper device 330 would need to be approximately 40 dB higher than SNR at the second wireless device 320, which is practically impossible to achieve). In particular, the SNR has to be higher at the eavesdropper device 330 because the eavesdropper device 330 does not receive a beamforming gain that the second wireless device 320 experiences due to the signals coherently combining at the spatial location of the second wireless device 320.

Accordingly, because the cryptographic key cannot be estimated or otherwise obtained by the eavesdropper device 330, the cryptographic key can be used to secure one or more communications between the first wireless device 310 and the second wireless device 320. For example, in some aspects, the first wireless device 310 may use the cryptographic key to encrypt information to be transmitted to the second wireless device 320, and the second wireless device 320 may use the cryptographic key to decrypt information received from the first wireless device 310. In a similar respect, the second wireless device 320 may use the cryptographic key to encrypt information to be transmitted to the first wireless device 310, and the first wireless device 310 may use the cryptographic key to decrypt information received from the second wireless device 320.

Additionally, or alternatively, the cryptographic key may be used as an authentication mechanism to verify an identity of a transmitting device. For example, because values of $\theta_n$, $a_n$, and $h_n$ are known or otherwise configured at the first wireless device 310, the first wireless device 310 may transmit the weighted sum $$\frac{\Sigma_n \theta_n a_n h_n}{\Sigma_n \theta_n h_n}$$

as a signature associated with one or more messages that are transmitted in a beam to the second wireless device 320 (e.g., in a manner analogous to a digital signature made using a private key in a public key or asymmetric cryptographic system). In this way, the second wireless device 320 may independently calculate the weighted sum based on the beam that is received via the one or more receive antennas, and compare the calculation of the weighted sum to the signature received from the first wireless device 310. In this way, if the calculation of the weighted sum matches the signature received from the first wireless device 310, the second wireless device 320 may verify the legitimacy of the transmitting device and/or detect when a beam is being transmitted by a fraudulent device (e.g., as in a man-in-the-middle attack) if the calculation of the weighted sum differs from the signature that accompanies the beam transmission. Furthermore, because the fingerprinting mechanism described herein is based on the weighted sum that includes one or more DPD coefficients that relate to a channel phase, a beamforming phase, and/or the like, the second wireless device 320 does not have to be located at a center of the beam in order to compute an expected signature of the first wireless device 310. Furthermore, because the eavesdropper device 330 and the first wireless device 310 are in different spatial locations, the eavesdropper device 330 cannot produce a transmit beam with the channel phase $h_n$ even if the eavesdropper device 330 somehow obtains the value of the weighted sum $$\frac{\Sigma_n \theta_n a_n h_n}{\Sigma_n \theta_n h_n}.$$

In some aspects, to provide further security through additional degrees of randomness, the first wireless device 310 may generate one or more waveforms to utilize the one or more impairments that provide the unique fingerprint of the first wireless device 310 in a controlled manner. For example, in some aspects, the first wireless device 310 may configure or otherwise control values for $a_n$ for each power amplifier by using different input powers, different power supply levels, and/or the like per power amplifier. Accordingly, during a key establishment phase, the first wireless device 310 may transmit with different power levels per power amplifier, which may result in a specific combination of $a_n$ to be used as a cryptographic key or fingerprint for authentication because the value of $a_n$ for a particular power amplifier may generally depend on a power backoff that relates to a saturation of the power amplifier. For example, if a signal is transmitted at a power that is sufficiently backed off the saturation point of the power amplifier, $a_n$ may have a small value and the power amplifier may behave linearly or have a small non-linear term. However, if the power is increased to a level that approaches the saturation point of the power amplifier, the value of $a_n$ may increase. Accordingly, by varying the power levels at which each power amplifier is operated (e.g., from zero to a power level that approaches the saturation point of the power amplifier), the first wireless device 310 can use a specific combination of $a_n$ to control which power amplifiers contribute to establishment of the cryptographic key or fingerprint, a contribution that each power amplifier makes to the establishment of the cryptographic key or fingerprint, and/or the like. Furthermore, the specific combination of $a_n$ used during the key establishment phase is not repeated during normal communications between the first wireless device 310 and the second wireless device 320, to prevent the eavesdropper device 330 from obtaining access to communications between the wireless devices 310, 320.

As indicated above, FIG. 3 is provided as an example. Other examples may differ from what is described with respect to FIG. 3.

Figure 4:
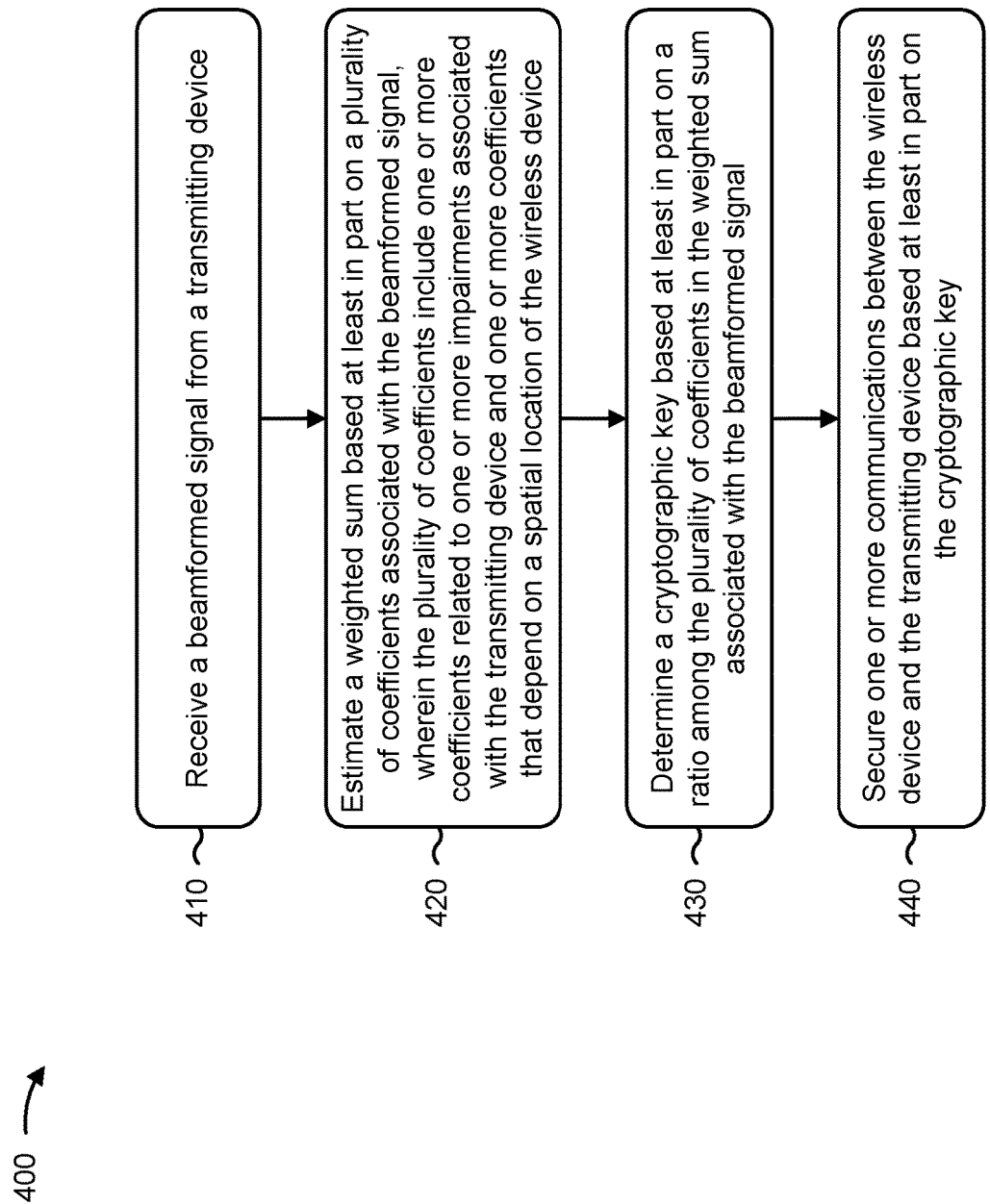
FIG. 4 is a diagram illustrating an example process performed, for example, by a wireless device, in accordance with various aspects of the present disclosure.

FIG. 4 is a diagram illustrating an example process 400 performed, for example, by a wireless device, in accordance with various aspects of the present disclosure. Example process 400 is an example where a wireless device (e.g., base station 110, UE 120, network controller 130, wireless device 310, wireless device 320, and/or the like) performs operations to generate a cryptographic key based at least in part on one or more impairments that relate to a unique physical layer fingerprint.

As shown in FIG. 4, in some aspects, process 400 may include receiving a beamformed signal from a transmitting device (block 410). For example, the wireless device (e.g., using antenna 234, DEMOD 232, MIMO detector 236, receive processor 238, controller/processor 240, antenna 252, DEMOD 254, MIMO detector 256, receive processor 258, controller/processor 280, controller/processor 290, communication unit 294, and/or the like) may receive a beamformed signal from a transmitting device, as described above.

As further shown in FIG. 4, in some aspects, process 400 may include estimating a weighted sum based at least in part on a plurality of coefficients associated with the beamformed signal, wherein the plurality of coefficients include one or more coefficients related to one or more impairments associated with the transmitting device and one or more coefficients that depend on a spatial location of the wireless device (block 420). For example, the wireless device (e.g., using controller/processor 240, controller/processor 280, controller/processor 290, and/or the like) may estimate a weighted sum based at least in part on a plurality of coefficients associated with the beamformed signal, as described above. In some aspects, the plurality of coefficients include one or more coefficients related to one or more impairments associated with the transmitting device and one or more coefficients that depend on a spatial location of the wireless device.

As further shown in FIG. 4, in some aspects, process 400 may include determining a cryptographic key based at least in part on a ratio among the plurality of coefficients in the weighted sum associated with the beamformed signal (block 430). For example, the wireless device (e.g., using controller/processor 240, controller/processor 280, controller/processor 290, and/or the like) may determine a cryptographic key based at least in part on a ratio among the plurality of coefficients in the weighted sum associated with the beamformed signal, as described above.

As further shown in FIG. 4, in some aspects, process 400 may include securing one or more communications between the wireless device and the transmitting device based at least in part on the cryptographic key (block 440). For example, the wireless device (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, controller/processor 290, communication unit 294, and/or the like) may secure one or more communications between the wireless device and the transmitting device based at least in part on the cryptographic key, as described above.

Process 400 may include additional aspects, such as any single aspect or any combination of aspects described below and/or in connection with one or more other processes described elsewhere herein.

In a first aspect, the beamformed signal combines coherently at the spatial location of the wireless device.

In a second aspect, alone or in combination with the first aspect, the one or more impairments associated with the transmitting device include non-linearities associated with one or more power amplifiers.

In a third aspect, alone or in combination with one or more of the first and second aspects, the cryptographic key is based at least in part on an average non-linearity among multiple power amplifiers.

In a fourth aspect, alone or in combination with one or more of the first through third aspects, the one or more impairments associated with the transmitting device include frequency-dependent residual sidebands associated with one or more power amplifiers.

In a fifth aspect, alone or in combination with one or more of the first through fourth aspects, the one or more impairments associated with the transmitting device include frequency drifts associated with one or more power amplifiers.

In a sixth aspect, alone or in combination with one or more of the first through fifth aspects, the one or more coefficients that depend on the spatial location of the wireless device include a channel phase between the wireless device and one or more transmit antennas at the transmitting device, and a beamforming phase applied at each of the one or more transmit antennas.

In a seventh aspect, alone or in combination with one or more of the first through sixth aspects, the one or more coefficients related to the one or more impairments associated with the transmitting device are based at least in part on transmit power levels associated with the beamformed signal.

In an eighth aspect, alone or in combination with one or more of the first through seventh aspects, the wireless device quantizes the plurality of coefficients, and the cryptographic key is determined based at least in part on the quantized plurality of coefficients.

In a ninth aspect, alone or in combination with one or more of the first through eighth aspects, securing the one or more communications between the wireless device and the transmitting device includes one or more of decrypting information received from the transmitting device using the cryptographic key, encrypting information transmitted to the transmitting device using the cryptographic key, or authenticating an identity of the transmitting device using the cryptographic key.

In a tenth aspect, alone or in combination with one or more of the first through ninth aspects, the beamformed signal includes one or more Volterra kernels that represent the one or more impairments associated with the transmitting device.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless device, comprising:
   receiving a beamformed signal from a transmitting device;
   estimating a weighted sum based at least in part on a plurality of coefficients associated with the beamformed signal, wherein the plurality of coefficients include one or more coefficients related to one or more impairments associated with the transmitting device and one or more coefficients that depend on a spatial location of the wireless device;
   determining a cryptographic key based at least in part on a ratio among the plurality of coefficients in the weighted sum associated with the beamformed signal; and
   securing one or more communications between the wireless device and the transmitting device based at least in part on the cryptographic key.

2. The method of claim 1, wherein the beamformed signal combines coherently at the spatial location of the wireless device.

3. The method of claim 1, wherein the one or more impairments associated with the transmitting device include non-linearities associated with one or more power amplifiers.

4. The method of claim 1, wherein the cryptographic key is based at least in part on an average non-linearity among multiple power amplifiers.

5. The method of claim 1, wherein the one or more impairments associated with the transmitting device include frequency-dependent residual sidebands associated with one or more power amplifiers.

6. The method of claim 1, wherein the one or more impairments associated with the transmitting device include frequency drifts associated with one or more power amplifiers.

7. The method of claim 1, wherein the one or more coefficients that depend on the spatial location of the wireless device include a channel phase between the wireless device and one or more transmit antennas at the transmitting device, and a beamforming phase applied at each of the one or more transmit antennas.

8. The method of claim 1, wherein the one or more coefficients related to the one or more impairments associated with the transmitting device are based at least in part on transmit power levels associated with the beamformed signal.

9. The method of claim 1, further comprising quantizing the plurality of coefficients, wherein the cryptographic key is determined based at least in part on the quantized plurality of coefficients.

10. The method of claim 1, wherein securing the one or more communications between the wireless device and the transmitting device includes one or more of decrypting information received from the transmitting device using the cryptographic key, encrypting information transmitted to the transmitting device using the cryptographic key, or authenticating an identity of the transmitting device using the cryptographic key.

11. The method of claim 1, wherein the beamformed signal includes one or more Volterra kernels that represent the one or more impairments associated with the transmitting device.

12. A wireless device for wireless communication, comprising:
   a memory; and
   one or more processors coupled with the memory, the memory and the one or more processors configured to:
      receive a beamformed signal from a transmitting device;
      estimate a weighted sum based at least in part on a plurality of coefficients associated with the beamformed signal, wherein the plurality of coefficients include one or more coefficients related to one or more impairments associated with the transmitting device and one or more coefficients that depend on a spatial location of the wireless device;
      determine a cryptographic key based at least in part on a ratio among the plurality of coefficients in the weighted sum associated with the beamformed signal; and
      secure one or more communications between the wireless device and the transmitting device based at least in part on the cryptographic key.

13. The wireless device of claim 12, wherein the beamformed signal combines coherently at the spatial location of the wireless device.

14. The wireless device of claim 12, wherein the one or more impairments associated with the transmitting device include non-linearities associated with one or more power amplifiers.

15. The wireless device of claim 12, wherein the cryptographic key is based at least in part on an average non-linearity among multiple power amplifiers.

16. The wireless device of claim 12, wherein the one or more impairments associated with the transmitting device include frequency-dependent residual sidebands associated with one or more power amplifiers.

17. The wireless device of claim 12, wherein the one or more impairments associated with the transmitting device include frequency drifts associated with one or more power amplifiers.

18. The wireless device of claim 12, wherein the one or more coefficients that depend on the spatial location of the wireless device include a channel phase between the wireless device and one or more transmit antennas at the transmitting device, and a beamforming phase applied at each of the one or more transmit antennas.

19. The wireless device of claim 12, wherein the one or more coefficients related to the one or more impairments associated with the transmitting device are based at least in part on transmit power levels associated with the beamformed signal.

20. The wireless device of claim 12, wherein the memory and the one or more processors are further configured to quantize the plurality of coefficients, wherein the cryptographic key is determined based at least in part on the quantized plurality of coefficients.

21. The wireless device of claim 12, wherein the memory and the one or more processors, when securing the one or more communications between the wireless device and the transmitting device, are further configured to one or more of decrypt information received from the transmitting device using the cryptographic key, encrypt information transmitted to the transmitting device using the cryptographic key, or authenticate an identity of the transmitting device using the cryptographic key.

22. The wireless device of claim 12, wherein the beamformed signal includes one or more Volterra kernels that represent the one or more impairments associated with the transmitting device.

23. A non-transitory computer-readable medium storing one or more instructions for wireless communication, the one or more instructions comprising:
  one or more instructions that, when executed by one or more processors of a wireless device, cause the one or more processors to:
    receive a beamformed signal from a transmitting device;
    estimate a weighted sum based at least in part on a plurality of coefficients associated with the beamformed signal, wherein the plurality of coefficients include one or more coefficients related to one or more impairments associated with the transmitting device and one or more coefficients that depend on a spatial location of the wireless device;
    determine a cryptographic key based at least in part on a ratio among the plurality of coefficients in the weighted sum associated with the beamformed signal; and
    secure one or more communications between the wireless device and the transmitting device based at least in part on the cryptographic key.

24. The non-transitory computer-readable medium of claim 23, wherein the beamformed signal combines coherently at the spatial location of the wireless device.

25. The non-transitory computer-readable medium of claim 23, wherein the one or more impairments associated with the transmitting device include non-linearities associated with one or more power amplifiers.

26. The non-transitory computer-readable medium of claim 23, wherein the cryptographic key is based at least in part on an average non-linearity among multiple power amplifiers.

27. The non-transitory computer-readable medium of claim 23, wherein the one or more impairments associated with the transmitting include frequency-dependent residual sidebands associated with one or more power amplifiers.

28. The non-transitory computer-readable medium of claim 23, wherein the one or more impairments associated with the transmitting device include frequency drifts associated with one or more power amplifiers.

29. The non-transitory computer-readable medium of claim 23, wherein the one or more coefficients that depend on the spatial location of the wireless device include a channel phase between the wireless device and one or more transmit antennas at the transmitting device, and a beamforming phase applied at each of the one or more transmit antennas.

30. The non-transitory computer-readable medium of claim 23, wherein the one or more coefficients related to the one or more impairments associated with the transmitting device are based at least in part on transmit power levels associated with the beamformed signal.

31. The non-transitory computer-readable medium of claim 23, wherein the one or more instructions, when executed by the one or more processors, further cause the one or more processors to quantize the plurality of coefficients, wherein the cryptographic key is determined based at least in part on the quantized plurality of coefficients.

32. The non-transitory computer-readable medium of claim 23, wherein the one or more instructions that cause the one or more processors to secure the one or more communications between the wireless device and the transmitting device further cause the one or more processors to one or more of decrypt information received from the transmitting device using the cryptographic key, encrypt information transmitted to the transmitting device using the cryptographic key, or authenticate an identity of the transmitting device using the cryptographic key.

33. The non-transitory computer-readable medium of claim 23, wherein the beamformed signal includes one or more Volterra kernels that represent the one or more impairments associated with the transmitting device.

34. An apparatus for wireless communication, comprising:
  means for receiving a beamformed signal from a transmitting device;
  means for estimating a weighted sum based at least in part on a plurality of coefficients associated with the beamformed signal, wherein the plurality of coefficients include one or more coefficients related to one or more impairments associated with the transmitting device and one or more coefficients that depend on a spatial location of the apparatus;
  means for determining a cryptographic key based at least in part on a ratio among the plurality of coefficients in the weighted sum associated with the beamformed signal; and
  means for securing one or more communications between the apparatus and the transmitting device based at least in part on the cryptographic key.

35. The apparatus of claim 34, wherein the beamformed signal combines coherently at the spatial location of the apparatus.

36. The apparatus of claim 34, wherein the one or more impairments associated with the transmitting device include non-linearities associated with one or more power amplifiers.

37. The apparatus of claim 34, wherein the cryptographic key is based at least in part on an average non-linearity among multiple power amplifiers.

38. The apparatus of claim 34, wherein the one or more impairments associated with the transmitting device include frequency-dependent residual sidebands associated with one or more power amplifiers.

39. The apparatus of claim 34, wherein the one or more impairments associated with the transmitting device include frequency drifts associated with one or more power amplifiers.

40. The apparatus of claim 34, wherein the one or more coefficients that depend on the spatial location of the apparatus include a channel phase between the apparatus and one or more transmit antennas at the transmitting device, and a beamforming phase applied at each of the one or more transmit antennas.

41. The apparatus of claim 34, wherein the one or more coefficients related to the one or more impairments associated with the transmitting device are based at least in part on transmit power levels associated with the beamformed signal.

42. The apparatus of claim 34, further comprising means for quantizing the plurality of coefficients, wherein the cryptographic key is determined based at least in part on the quantized plurality of coefficients.

43. The apparatus of claim 34, wherein the means for securing the one or more communications between the apparatus and the transmitting device includes one or more of means for decrypting information received from the transmitting device using the cryptographic key, means for encrypting information transmitted to the transmitting device using the cryptographic key, or means for authenticating an identity of the transmitting device using the cryptographic key.

44. The apparatus of claim 34, wherein the beamformed signal includes one or more Volterra kernels that represent the one or more impairments associated with the transmitting device.

* * * * *